(12) United States Patent
Hurd et al.

(10) Patent No.: US 8,407,271 B2
(45) Date of Patent: Mar. 26, 2013

(54) METHOD FOR FLOATING POINT ROUND TO INTEGER OPERATION

(75) Inventors: Kevin Hurd, Ft. Collins, CO (US);
Daryl Lieu, Menlo Park, CA (US);
Kelvin Goveas, Austin, TX (US); Scott Hilker, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 769 days.

(21) Appl. No.: 12/549,724

(22) Filed: Aug. 28, 2009

(65) Prior Publication Data

US 2011/0055307 A1    Mar. 3, 2011

(51) Int. Cl.
*G06F 7/38*    (2006.01)

(52) U.S. Cl. .................... 708/497; 708/551

(58) Field of Classification Search .......... 708/204–205, 708/496–499, 542–551
See application file for complete search history.

(56) References Cited

U.S. PATENT DOCUMENTS

| | | | |
|---|---|---|---|
| 5,561,615 A * | 10/1996 | Kuo et al. ..................... | 708/204 |
| 5,631,859 A | 5/1997 | Markstein et al. | |
| 5,802,386 A | 9/1998 | Kahle et al. | |
| 5,842,036 A | 11/1998 | Hinton et al. | |
| 6,029,243 A | 2/2000 | Pontius et al. | |
| 6,131,104 A | 10/2000 | Oberman | |
| 6,282,554 B1 * | 8/2001 | Abdallah et al. .............. | 708/204 |
| 6,510,446 B1 * | 1/2003 | Fukagawa ..................... | 708/497 |
| 6,542,984 B1 | 4/2003 | Keller et al. | |
| 6,721,772 B1 * | 4/2004 | Green et al. ................... | 708/497 |
| 6,879,992 B2 * | 4/2005 | Zohar ............................ | 708/550 |
| 6,965,906 B1 * | 11/2005 | Dhablania ..................... | 708/204 |
| 7,225,323 B2 * | 5/2007 | Siu et al. ........................ | 712/222 |
| 7,284,117 B1 | 10/2007 | Radhakrishnan et al. | |
| 7,689,640 B2 * | 3/2010 | Renno et al. .................. | 708/552 |
| 2003/0061467 A1 | 3/2003 | Yeh et al. | |
| 2003/0126406 A1 | 7/2003 | Hammarlund et al. | |
| 2004/0254973 A1 * | 12/2004 | Tang et al. ..................... | 708/670 |
| 2008/0077779 A1 * | 3/2008 | Zohar et al. ................... | 712/226 |

OTHER PUBLICATIONS

"Trace Cache: a Low Latency Approach to High Bandwidth Instruction Fetching"; Rotenberg, Eric, et al.; IEEE 1996; pp. 24-34.

* cited by examiner

*Primary Examiner* — Chuong D Ngo
*Assistant Examiner* — Matthew Sandifer
(74) *Attorney, Agent, or Firm* — Rory D. Rankin; Meyertons, Hood, Kivlin, Kowert & Goetzel, P.C.

(57) ABSTRACT

An apparatus and method for computing a rounded floating point number. A floating point unit (FPU) receives an instruction to round a floating point number to a nearest integral value and retrieves a binary source operand having an exponent of a fixed first number of bits and a mantissa of a fixed second number of bits. If the unbiased exponent value is greater than or equal to zero and less than the fixed second number, the FPU generates a mask having N consecutive '1' bits beginning with the least significant bit and whose remaining bits have a value of '0', where N is equal to the fixed second number minus the unbiased exponent value. The FPU computes a bitwise OR of the source operand with the mask, increments the result if the instruction is to round up, and computes a bitwise AND of the result with the inverse of the mask.

20 Claims, 9 Drawing Sheets

METHOD FOR FLOATING POINT ROUND TO INTEGER OPERATION

BACKGROUND OF THE INVENTION

1. Field of the Invention

This invention relates to computer processors and, more particularly, to performing floating point to nearest integer operations in computer processors.

2. Description of the Related Art

Microprocessors have evolved to include a variety of features aimed at improving the speed and efficiency of calculations. For example, microprocessors may be designed to execute various floating point instructions. Floating point refers to a system for representing numbers in which a string of digits or bits represents a rational number. In a floating point number, a radix point (sometimes referred to as a decimal point or a binary point) may be placed anywhere relative to the significant digits or bits of the number. A floating point instruction, as used herein, is therefore any computer instruction that takes as input or produces as output one or more floating point numbers.

Floating point instructions may be executed by hardware built into any of a variety of general-purpose microprocessors that have been designed around a variety of instruction architectures. For example, the x86 architecture (also known as the IA-32 architecture) has enjoyed widespread acceptance and success in the marketplace. Other processors may be designed to support various other architectures such as PowerPC, SPARC, ARM, MIPS, etc. that include various floating point instructions.

In order to increase available processing power, computer systems may include multiple general-purpose microprocessors. Alternatively, or in addition, computer systems may include one or more special-purpose processing units. For example, many computer systems include one or more graphics processing units (GPUs) as separate processors or incorporated into a microprocessor intended to execute graphics calculations. Graphics calculations tend to make heavy use of floating point instructions. Further, modern processors may include multiple execution units, each of which is capable of executing a variety of instructions in parallel, including floating point instructions. In particular, some processors may include one or more execution units dedicated to the purpose of executing floating-point instructions, often referred to as floating point execution units or FPUs. Generally speaking, any of the above processing units may support various floating point instructions.

Often in the course of performing floating point operations, it may be desired to round a floating point number to the nearest integer value. In addition, it may be desired that the result be expressed as a floating point number. In other words, it may be desirable to round a floating point number to the nearest integral valued floating point number. Some examples of instructions that may be found in one or more versions of the x86 architecture that output a floating point number that has been rounded to a nearest integral value include: FRND-INT, ROUNDPD, ROUNDPS, ROUNDSD, and ROUNDSS instructions. In general, implementations of these and similar instructions have included a first operation to convert a floating point number to a nearest integer followed by a second operation to convert the integer back to a floating point number. Unfortunately, the second operation increases the overall latency of such implementations.

In view of the above, a more efficient method and mechanism for performing operations that round floating point numbers to a nearest integer and express the result as a floating point number are desired.

SUMMARY OF THE INVENTION

Various embodiments of a processor and methods are disclosed. The processor includes a decode unit and a floating point unit. The floating point unit receives an instruction from the decode unit. In response to determining the instruction corresponds to a floating point round to nearest integral value instruction, the floating point unit retrieves a binary source operand having an exponent represented by a fixed first number of bits and a mantissa represented by a fixed second number of bits. The floating point unit computes an unbiased exponent value. If the unbiased exponent value is greater than or equal to zero and less than the fixed second number, the floating point unit calculates a mask count whose value is equal to the fixed second number minus the unbiased exponent value. The floating point unit generates a binary mask having N consecutive bits having a value of '1' beginning with the least significant bit and whose remaining bits have a value of '0', where N is a number whose value is equal to the value of the mask count. The floating point unit computes a first intermediate result equal to a bitwise OR of the source operand with the binary mask, computes a second intermediate result equal to the first intermediate result if the instruction corresponds to a round down instruction and equal to the first intermediate result incremented by one if the instruction corresponds to a round up instruction, computes a bitwise inverse of the binary mask, and generates a result equal to a bitwise AND of the inverse of the binary mask and the second intermediate result. In a further embodiment, the floating point unit stores the result in a destination operand storage area.

In a still further embodiment, if the unbiased exponent value is greater than or equal to the fixed second number, the floating point unit generates a binary mask in which each bit has a value of '0'. In a still further embodiment, if the unbiased exponent value is less than "−1", the floating point unit generates a binary mask in which each bit has a value of '0' and prior to computing a first intermediate result equal to a bitwise OR of the source operand with the binary mask, replaces the source operand with a constant whose value is "0.0" if the instruction corresponds to a round down instruction and whose value is "1.0" if the instruction corresponds to a round up instruction. In a still further embodiment, if the unbiased exponent value is equal to "−1" the floating point unit generates a binary mask in which each bit has a value of '1'.

In one embodiment, the fixed first number of bits is 18 and the fixed second number of bits is 64. In another embodiment, the source operand includes multiple, packed floating point values and the instruction corresponds to an instruction to round each of the floating point values to a respective nearest integral value.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Generally speaking, the invention herein described may be implemented through any of a variety of processing devices including a central processing unit (CPU), graphics processing unit (GPU), floating point execution unit (FPU) or a portion of any of the above units. In the discussions that follow, a general-purpose processor core that includes at least one FPU will be used as a non-limiting example. Various other embodiments are possible and are contemplated.

Overview of Processor Core

Figure 1:
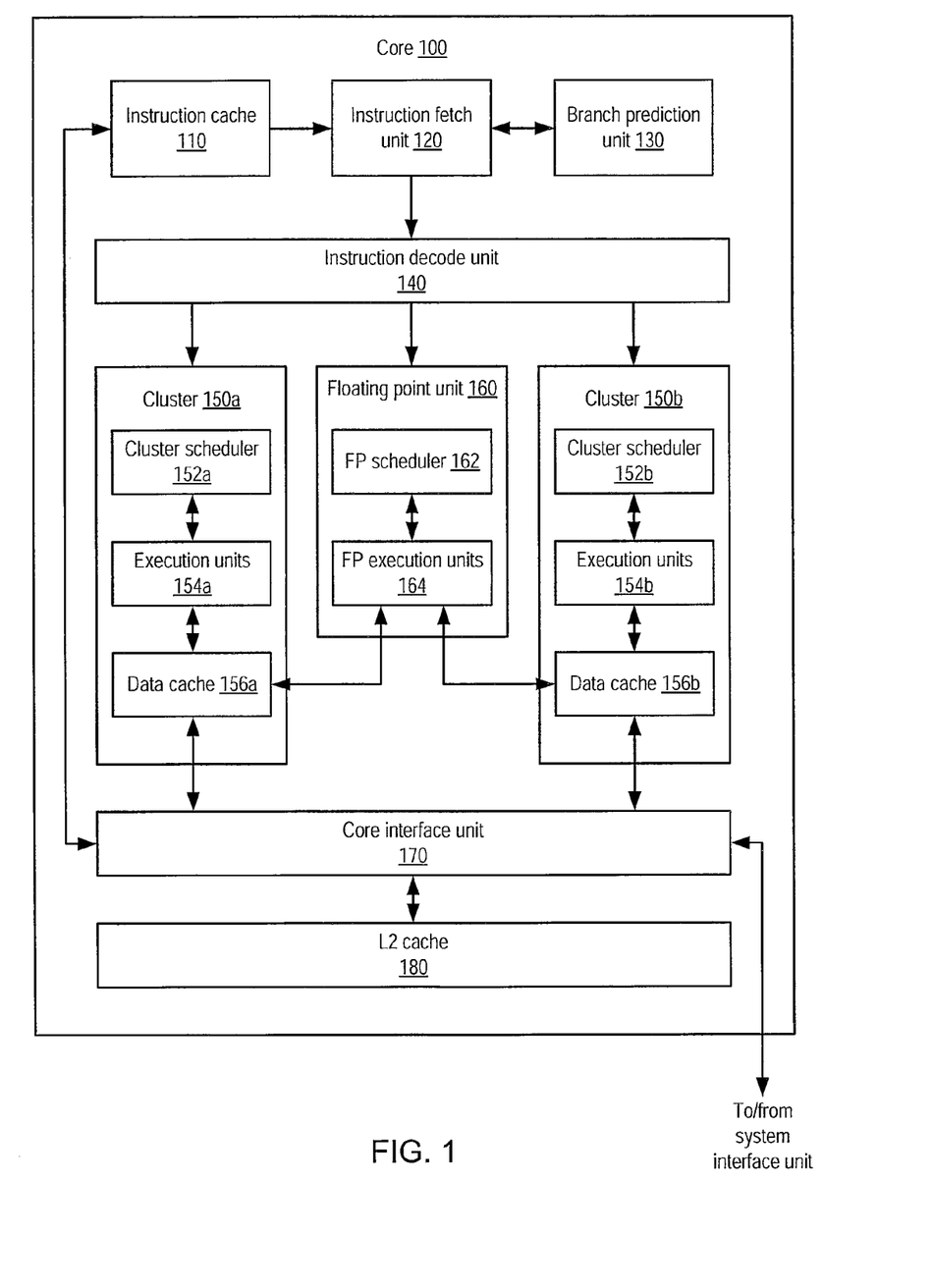
FIG. 1 illustrates one embodiment of a processor core.

FIG. 1 illustrates one embodiment of a processor core 100. Generally speaking, core 100 may be configured to execute instructions that may be stored in a system memory that is directly or indirectly coupled to core 100. Such instructions may be defined according to a particular instruction set architecture (ISA). For example, core 100 may be configured to implement a version of the x86 ISA, although in other embodiments core 100 may implement a different ISA or a combination of ISAs.

In the illustrated embodiment, core 100 may include an instruction cache (IC) 110 coupled to provide instructions to an instruction fetch unit (IFU) 120. IFU 120 may be coupled to a branch prediction unit (BPU) 130 and to an instruction decode unit 140. Decode unit 140 may be coupled to provide operations to a plurality of integer execution clusters 150a-b as well as to a floating point unit (FPU) 160. Each of clusters 150a-b may include a respective cluster scheduler 152a-b coupled to a respective plurality of integer execution units 154a-b. Clusters 150a-b may also include respective data caches 156a-b coupled to provide data to execution units 154a-b. In the illustrated embodiment, data caches 156a-b may also provide data to floating point execution units 164 of FPU 160, which may be coupled to receive operations from FP scheduler 162. Data caches 156a-b and instruction cache 110 may additionally be coupled to core interface unit 170, which may in turn be coupled to a unified L2 cache 180 as well as to a system interface unit (SIU) that is external to core 100 (not shown). It is noted that although FIG. 1 reflects certain instruction and data flow paths among various units, additional paths or directions for data or instruction flow not specifically shown in FIG. 1 may be provided.

Core 100 may be configured for multithreaded execution in which instructions from distinct threads of execution may concurrently execute. In one embodiment, each of clusters 150a-b may be dedicated to the execution of instructions corresponding to a respective one of two threads, while FPU 160 and the upstream instruction fetch and decode logic may be shared among threads. In other embodiments, it is contemplated that different numbers of threads may be supported for concurrent execution, and different numbers of clusters 150 and FPUs 160 may be provided.

Generally speaking, clusters 150 may be configured to implement integer arithmetic and logic operations as well as to perform load/store operations. In one embodiment, each of clusters 150a-b may be dedicated to the execution of operations for a respective thread, such that when core 100 is configured to operate in a single-threaded mode, operations may be dispatched to only one of clusters 150. Each cluster 150 may include its own scheduler 152, which may be configured to manage the issuance for execution of operations previously dispatched to the cluster. Each cluster 150 may further include its own copy of the integer physical register file as well as its own completion logic (e.g., a reorder buffer or other structure for managing operation completion and retirement).

Within each cluster 150, execution units 154 may support the concurrent execution of various different types of operations. For example, in one embodiment execution units 154 may support two concurrent load/store address generation (AGU) operations and two concurrent arithmetic/logic (ALU) operations, for a total of four concurrent integer operations per cluster. Execution units 154 may support additional operations such as integer multiply and divide, although in various embodiments, clusters 150 may implement scheduling restrictions on the throughput and concurrency of such additional operations with other ALU/AGU operations. Additionally, each cluster 150 may have its own data cache 156 that, like instruction cache 110, may be implemented using any of a variety of cache organizations. It is noted that data caches 156 may be organized differently from instruction cache 110.

In the illustrated embodiment, unlike clusters 150, FPU 160 may be configured to execute floating point operations from different threads, and in some instances may do so concurrently. FPU 160 may include FP scheduler 162 that, like cluster schedulers 152, may be configured to receive, queue and issue operations for execution within FP execution units 164. FPU 160 may also include a floating point physical register file configured to manage floating point operands. FP execution units 164 may be configured to implement various types of floating point operations, such as add, multiply, divide, and multiply-accumulate, as well as other floating point, multimedia or other operations that may be defined by the ISA. In various embodiments, FPU 160 may support the concurrent execution of certain different types of floating point operations, and may also support different degrees of precision (e.g., 64-bit operands, 128-bit operands, etc.). As shown, FPU 160 may not include a data cache but may instead be configured to access the data caches 156 included within clusters 150. In some embodiments, FPU 160 may be configured to execute floating point load and store instructions, while in other embodiments, clusters 150 may execute these instructions on behalf of FPU 160.

In various embodiments, a processor implementation may include multiple instances of core 100 fabricated as part of a single integrated circuit along with other structures. A processor may be coupled to system memory consisting of one or more different types of random access memory (RAM) such as Dual Data Rate Synchronous Dynamic RAM (DDR SDRAM), DDR-2 SDRAM, Fully Buffered Dual Inline Memory Modules (FB-DIMM), or another suitable type of memory. The contents of system memory may be cached by various ones of the caches described above.

In one embodiment, core 100 may use floating point execution units 164 to execute a variety of floating point instructions including floating point rounding instructions such as FRNDINT, ROUNDPD, ROUNDPS, ROUNDSD, and ROUNDSS. Each of the above instructions rounds a floating point operand to the nearest integer value and expresses the result as a floating point number. In one embodiment, a single one of floating point execution units 164 may execute any of these instructions, as described in detail below. The formats of the operands on which these instructions may operate are listed in Table 3 below.

Figure 2:
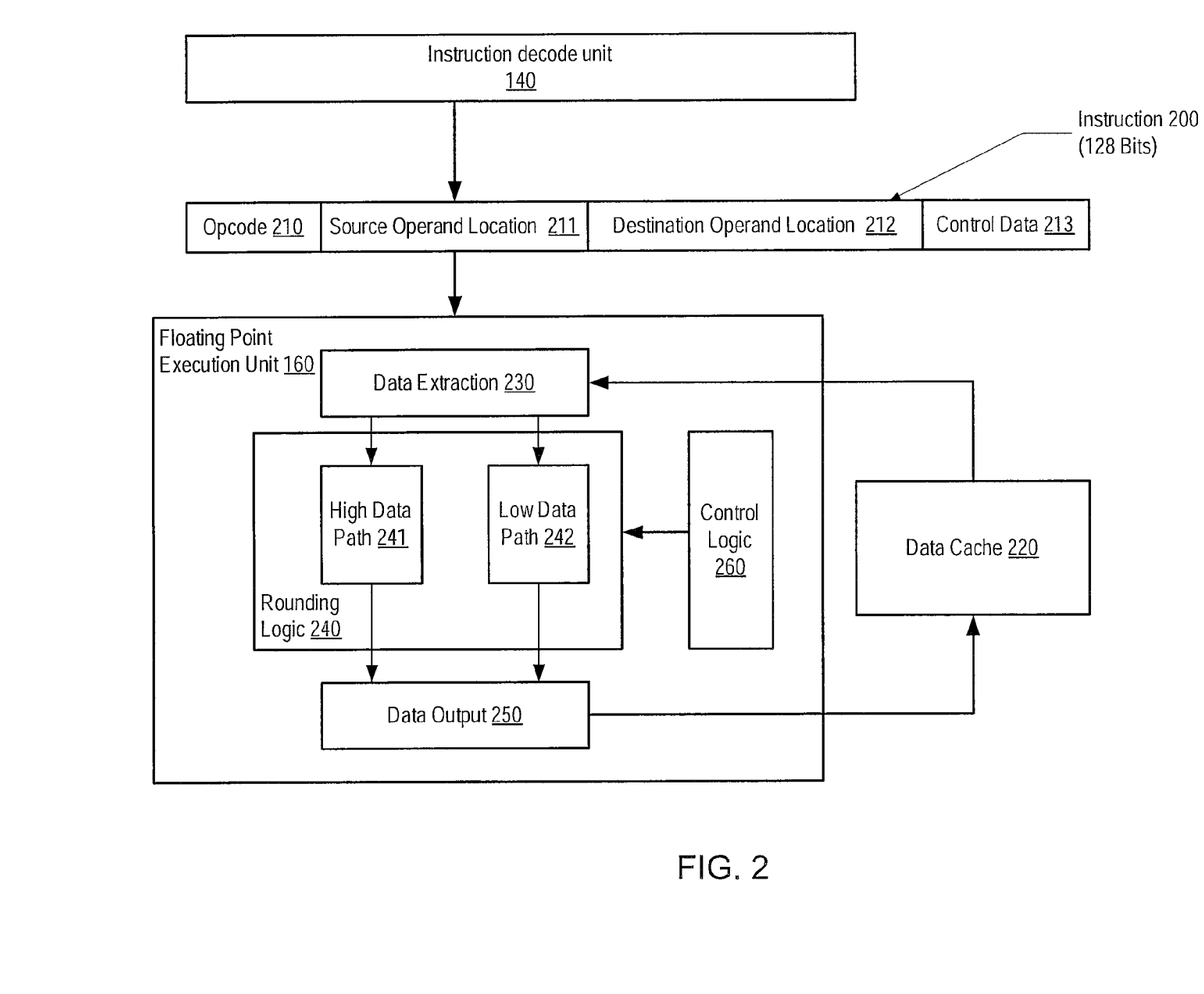
FIG. 2 illustrates one embodiment of a portion of processor core operating on a floating point instruction.

FIG. 2 illustrates one embodiment of a portion of processor core 100 operating on a floating point instruction 200. The illustrated portion of processor core 100 includes instruction decode unit 140, floating point unit (FPU) 160, and a data cache 220 that represents one or more storage locations, registers, etc such as may be found within any of data caches 156a, 156b, etc. In one embodiment, FPU 160 may include a data extraction component 230 coupled to rounding logic 240, which in turn is coupled to a data output component 250. Rounding logic 240 is also coupled to control logic 260. Data extraction component 230 and data output component 250 are further coupled to data cache 220. In a further embodiment, rounding logic 240 may include a high data path 241 and a low data path 242. Also illustrated is an instruction 200, which includes an opcode 210, a source operand location 211, a destination operand location 212, and control data 213. In one embodiment, instruction 200 includes 128 bits of which opcode 210 includes 8 bits and control data 213 includes 16 bits. For convenience, the following discussion will be confined to immediate versions of these and similar instructions, although it will be apparent to one of ordinary skill in the art that the invention may be applied equally to similar, non-immediate instructions.

During operation, instruction decode unit 140 may decode instruction 200 and convey the decoded result to FPU 160. Within FPU 160, data extraction component 230 may retrieve a source operand from a location in data cache 220 as indicated by source operand location 211. Data extraction component 230 may then convey the source operand to rounding logic 240. Also within FPU 160, control logic 260 may interpret control data 213 to determine the type of rounding operation to be performed. Rounding logic 240 may perform a rounding operation according to a mode indicated by control logic 260 and convey the result to data output component 250. Data output component 250 may then convey the result to data cache 220, completing the desired rounding operation.

Figure 3:
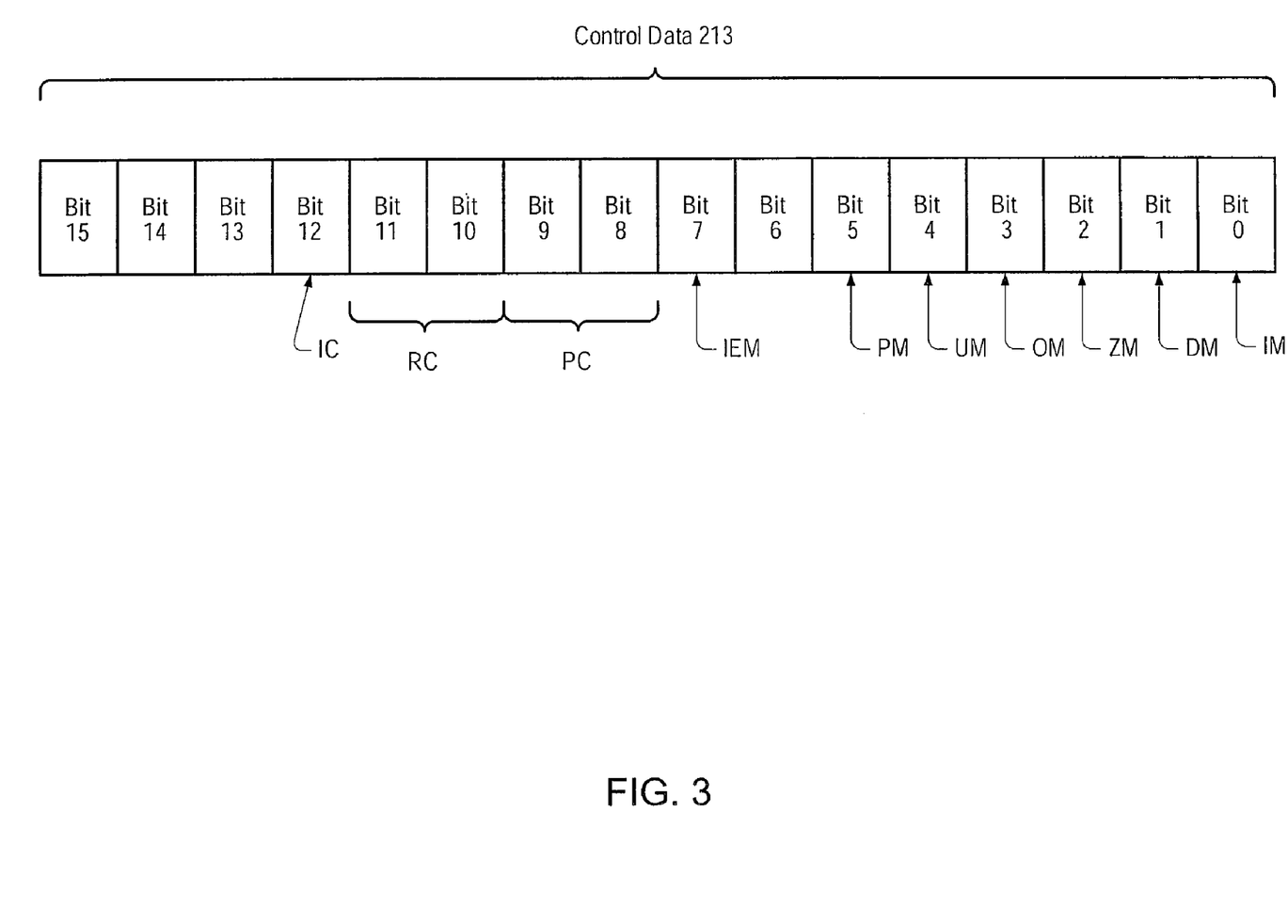
FIG. 3 illustrated one embodiment of control data for controlling a rounding instruction.

FIG. 3 illustrated one embodiment of control data 213 for controlling a rounding instruction. In the illustrated embodiment, control data 213 includes 16 bits as shown in Table 1.

TABLE 1

| Control Data 213. | | |
|---|---|---|
| Bit Number | Name | Rounding Mode Function |
| 0 | IM | N/A, used for interrupt masking |
| 1 | DM | N/A, used for interrupt masking |
| 2 | ZM | N/A, used for interrupt masking |
| 3 | OM | N/A, used for interrupt masking |
| 4 | UM | N/A, used for interrupt masking |
| 5 | PM | N/A, used for interrupt masking |
| 6 | — | Reserved |
| 7 | IEM | Interrupt Enable Mask |

TABLE 1-continued

| Control Data 213. | | |
|---|---|---|
| Bit Number | Name | Rounding Mode Function |
| 9:8 | PC | Precision Control |
| 11:10 | RC | Rounding Control |
| 12 | IC | Infinity Control |
| 15:13 | — | Reserved |

Table 2, as shown below, illustrates an interpretation of the values of the rounding control bits of control data 213.

TABLE 2

| Rounding Modes | | |
|---|---|---|
| Control Data 213, Bit 11 | Control Data 213, Bit 10 | Rounding Mode |
| 0 | 0 | Round to nearest even |
| 0 | 1 | Round down (toward − ∞) |
| 1 | 0 | Round up (toward + ∞) |
| 1 | 1 | Round down zero (truncate) |

The value of opcode 210 indicates the particular instruction that is to be executed. For rounding, different instructions may be used for different sized source operands. Also, a source operand may include one, two, or four, etc. packed, floating point numbers. To simplify the discussions that follow, all source operands may be assumed to have a sign bit, an exponent, and a mantissa, each encoded as binary numbers. Some examples of rounding instructions and their corresponding source operands are listed in Table 3.

TABLE 3

| Floating point operand formats | | | | | |
|---|---|---|---|---|---|
| Operand Size | Precision | Exponent Size | Mantissa Size (M) | Numbers in operand | Example Rounding Instruction |
| 128 bits | Single | 8 bits | 23 bits | 1 | ROUNDSS |
| 128 bits | Single | 8 bits | 23 bits | 4 | ROUNDPS |
| 128 bits | Double | 11 bits | 52 bits | 1 | ROUNDSD |
| 128 bits | Double | 11 bits | 52 bits | 2 | ROUNDPD |
| 80 bits | Extended | 15 bits | 64 bits | 1 | FRNDINT |

In one embodiment, source operands that include a singe number may use a combination of the high data path 241 and a low data path 242 of rounding logic 240 to execute a rounding instruction, using control logic 260 to link various stages of the high and low paths. ource operands that include two numbers may use high data path 241 to execute a rounding instruction on one number and low data path 242 to execute a rounding instruction on another number. Source operands that include four numbers may use high data path 241 to execute a rounding instruction on two numbers and low data path 242 to execute a rounding instruction on two other number.

Floating point numbers may be expressed in a variety of formats. The standard format that will be used herein is the IEEE 754 Standard, although other standards may be used without loss of generality. For discussion purposes, floating point numbers may be referred to using the following notion and nomenclature. A number X is a floating point number, such that $$X = (-1)^{S} * 2^{q} * m,$$

where S=sign bit, q=exponent, and m=mantissa. Hereinafter, floating point numeric values may be expressed in double quotes or without quotes and logical, binary values may expressed in single quotes. For example, a floating point number may be said to have a value of "1.0", meaning the value of the floating point number is "1.0" to the level of precision that the floating point standard is capable of expressing, irrespective of what that standard is, whereas a particular bit in a floating point number or other binary number may be said to have a value of '1', meaning the bit is logically asserted. In one embodiment, since the first bit of the mantissa is always a '1', it may be omitted from the mantissa to allow an extra bit of precision in the mantissa. For a given level of precision, the mantissa may have a fixed number of bits M. For instance, as indicated in Table 3 above, for single precision floating point numbers, M=23. A source operand may be referred to as Xin and a destination operand, rounded to the nearest integral value, may be referred to as Xout.

In some embodiments, rounding operations may be simplified by noting that if q>M, then the floating point number has no fractional component and is already a pure integer. In this case, Xout=Xin. Also, if q≦−2, then X<0.5 and rounding X to the nearest integer means Xout="0.0" for a rounding mode of down and "1.0" for a rounding mode of up. The remaining values of q are −1≦q≦M.

Figure 4:
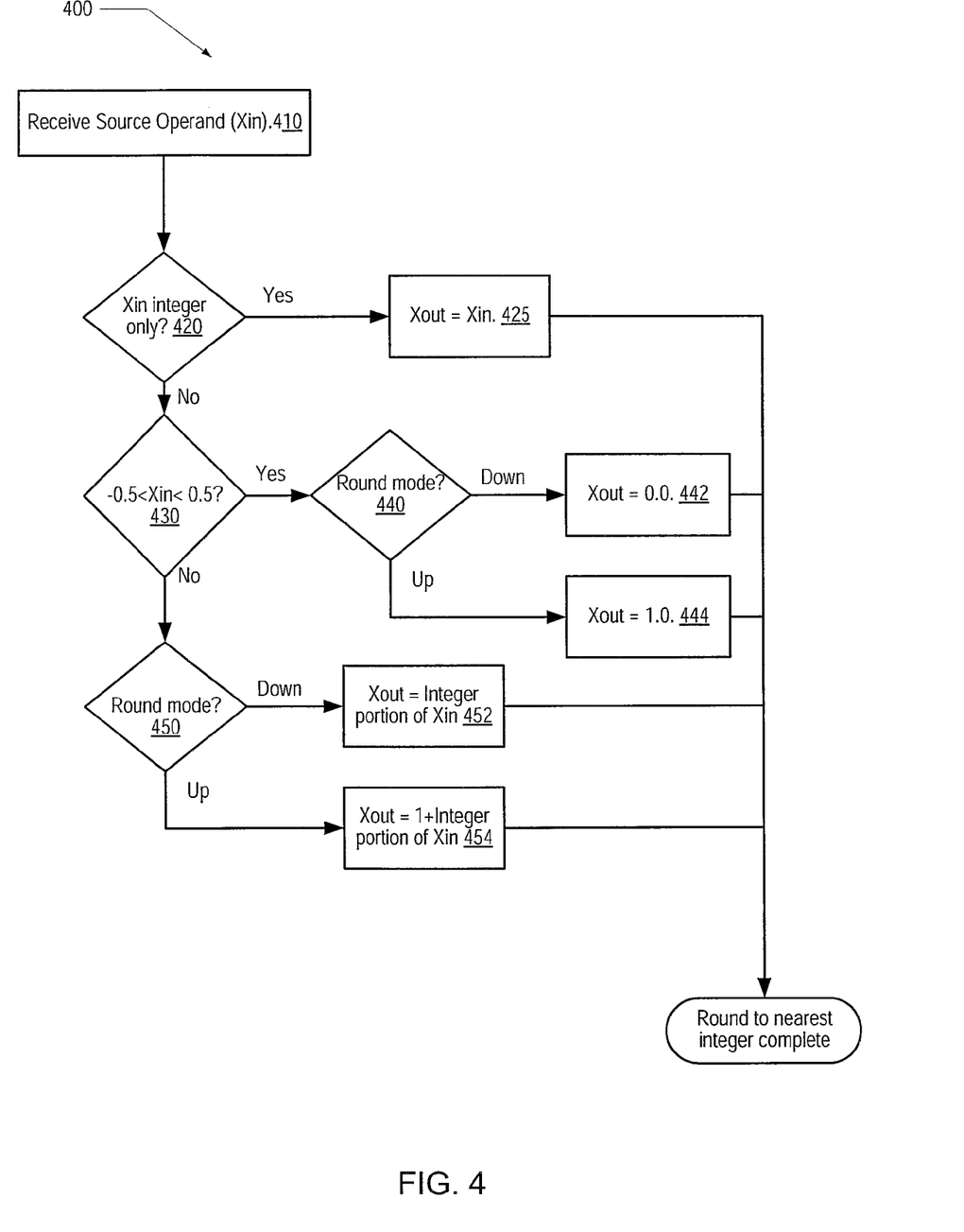
FIG. 4 is a high level flow diagram illustrating one example of an algorithm for performing a floating point round to nearest integer operation.

Turning now to FIG. 4, a high level flow diagram illustrating one example of an algorithm 400 for performing a floating point round to nearest integer operation is shown. Algorithm 400 is a meant to be conceptual and not dependent on any particular implementation. Algorithm 400 may begin with receipt of a source operand Xin (block 410). If Xin is an integer only (decision block 420), i.e., if the value of the exponent is greater than the number of bits in the mantissa, then algorithm 400 need not change Xin, Xout may be set to Xin (block 425), and the round to nearest integer algorithm is complete. If Xin is not an integer only (decision block 420), i.e., if the value of the exponent is less than or equal to the number of bits in the mantissa, and if the value of Xin is greater than "−0.5" and less than "+0.5" (decision block 430), the value of Xout may be determined by the round mode alone. If the round mode is down (decision block 440), the value of Xout may be set to "0.0" (block 442) and the round to nearest integer algorithm is complete. If the round mode is up (decision block 440), the value of Xout may be set to "1.0" (block 444) and the round to nearest integer algorithm is complete. If the value of the exponent is less than or equal to the number of bits in the mantissa, and if the absolute value of Xin is greater than or equal to "+0.5" (decision block 430), the value of Xout may be determined by a combination of the round mode and the fractional component of Xin, i.e., the value of the mantissa to the right of the radix point. If the round mode is down (decision block 450), the value of Xout may be set to the integer portion of Xin (block 452) and the round to nearest integer algorithm is complete. If the round mode is up (decision block 450), the value of Xout may be set to the integer portion of Xin+"1.0" (block 454) and the round to nearest integer algorithm is complete.

In one embodiment, rounding logic 240 as shown in FIG. 2 may be configured to handle source operands that include a variety of different levels of precision. The numeric values of each of the exponent ranges described in algorithm 400, as well as various other parameter values such as the size of the mantissa (M) and the bias value of the exponent (B) depend on the level of precision of the source operand as illustrated in Table 4.

TABLE 4

Characteristics of floating point numbers of various levels of precision.

| Parameter | Single or double operand, single precision | Single operand, double precision | Single operand, extended precision (x87) |
| --- | --- | --- | --- |
| R = Working Operand Register Size (bits) | 2 × 32 | 64 | 64 |
| Mantissa Size (M) (bits) including implied '1' bit | 24 | 53 | 64 |
| Exponent Size (bits) | 8 | 11 | 15 |
| Exponent (EXP) Range | 1 to 254 | 1 to 2046 | 1 to 32766 |
| Exponent Bias (B) | 127 | 1023 | 16383 |
| Integer only, Exponent in Overflow Range | 151 ≦ EXP | 1076 ≦ EXP | 16447 ≦ EXP |
| Mixed Range | 127 ≦ EXP < 159 | 1023 ≦ EXP < 1076 | 16383 ≦ EXP < 16447 |
| Force output to 0.0 or 1.0 | EXP = 126 | EXP = 1022 | EXP = 16382 |
| Underflow Range | 1 ≦ EXP < 126 | 1 ≦ EXP < 1022 | 1 ≦ EXP < 16382 |

It is noted that the size of the mantissa, M, does not include an implied first bit whose value is always equal to '1', as defined in the IEEE 754-2008 Standard except for the case of single operand, extended precision (x87).

Figure 5:
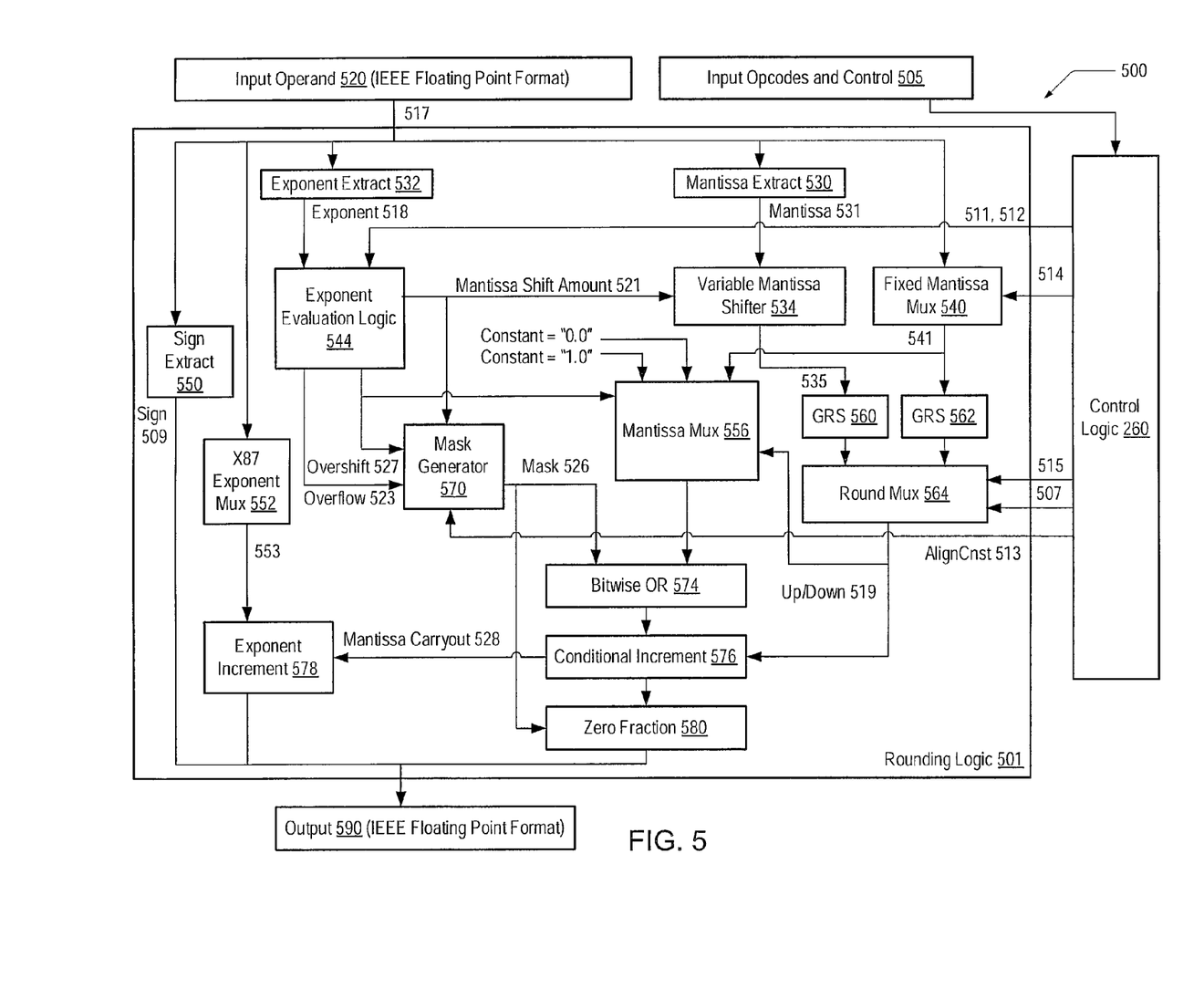
FIG. 5 is a detailed block diagram of one embodiment of rounding logic for rounding floating point numbers.

Turning now to FIG. 5, a detailed block diagram of one embodiment of rounding logic 501 that is representative of the logic in high data path 241 or low data path 242 for rounding floating point numbers is shown. In one embodiment, rounding logic 501 may be contained within FPU 160. Rounding logic 501 is shown coupled to receive data 517 from an input operand 520. Also, control logic 260 is shown coupled to receive input from opcodes and control 505, convert the inputs to output control signals 507 and 511-515, and convey the outputs to rounding logic 501. Rounding logic 501 is further coupled to output 590 to which the result of a rounding operation may be conveyed.

In the illustrated embodiment, rounding logic 501 includes a mantissa extract component 530, an exponent extract component 532, an x87 exponent mux 552, a sign extract component 550, and a fixed mantissa mux 540, each of which is coupled to receive input operand 517. Mantissa extract component 530 is further coupled to convey a mantissa 531 to a variable mantissa shifter 534. Extract component 532 is further coupled to convey an exponent 518 to exponent evaluation logic 544. X87 exponent mux 552 is further coupled to convey an x87 exponent 553 to an exponent increment component 578. Sign extract component 550 is further coupled to convey a sign 509 to output 590. Fixed mantissa mux 540 is further coupled to convey a mantissa and exponent 541 to a mantissa mux 556 and to a GRS component 562. Rounding logic 501 further includes a mask generator 570, a bitwise OR 574, a conditional increment 576, a zero fraction 580, an exponent increment 578, GRS 560, GRS 562, and a round mux 564. Exponent evaluation logic 544 is coupled to receive constants 511 and 512 from control logic 260 and exponent 518 from exponent extract component 532 and convey a mantissa shift amount 521 to variable mantissa shifter 534 and to mask generator 570, to convey an overshift 527 to mantissa mux 556 and to mask generator 570, and to convey an overflow 523 to mask generator 570. Variable mantissa shifter 534 is further coupled to receive a mantissa shift amount 521 from exponent evaluation logic 544 and convey a mantissa 535 to GRS 560. GRS 560 and GRS 562 are configured to perform conventional guard-round-sticky calculations on mantissas 535 and 541, respectively and convey the results to round mux 564. Mask generator 570 is further coupled to convey a mask 526 to bitwise OR 574 and zero fraction 580. Round mux 564 is further coupled to receive control signals 507 and 515 from control logic 260 and convey an up/down signal 519 to conditional increment 576 and to mantissa mux 556. Mantissa mux 556 is further coupled to receive a constant that represents a floating point value of "0.0", a constant that represents a floating point value of "1.0", and up/down signal 519 from round mux 564 and convey a mantissa and exponent to bitwise OR 574. Bitwise OR 574 is further coupled to convey a first intermediate result including a mantissa and exponent to conditional increment 576. Conditional increment 576 is further coupled to convey a mantissa carryout signal 528 to exponent increment 578 and a second intermediate result including a mantissa and exponent to zero fraction 580. Exponent increment component 578 is further coupled to convey an x87 exponent to output 590. Zero fraction 580 is further coupled to convey an output result including a mantissa and exponent to output 590.

During operation, control logic 260 may decode an input opcode and control signals 505 and determine that one of a variety of instructions has been requested. Control logic 260 may determine that rounding logic 501 may be used to execute particular instructions such as floating point round to a nearest integral value instructions. In one embodiment, rounding logic 501 may be used to execute various other instructions in addition to floating point rounding instructions at the direction of control logic 260. Some portions of rounding logic 501 may be specifically designed for and employed in execution of instructions that round a floating point number to the nearest integral value. Among these portions are mask generator 570, bitwise OR 574, and zero fraction 580. Other portions of rounding logic 501 may be used to execute various other instructions in addition to instructions that round a floating point number to the nearest integral value.

If control logic 260 determines that an instruction request is a request to execute an instruction to round a floating point number to a nearest integral value, rounding logic 501 may be directed as follows. Input operand 517 may be received and passed through fixed mantissa mux 540 as mantissa and exponent 541 to mantissa mux 556 and to GRS component 562. Mantissa extract component 530 may receive input operand 517, extract mantissa 531, and convey the extracted mantissa to variable mantissa shifter 534. If input operand 517 is not an x87 extended precision operand, exponent extract component 532 may receive input operand 517, extract exponent 518, and convey the extracted exponent to exponent evaluation logic 544. If input operand 517 is an x87 extended precision operand, x87 exponent mux 552 may receive input operand 517 and convey extended exponent 553 to exponent increment 578. Sign extract component 550 may receive input operand 517, extract sign 509, and convey the extracted sign to output 590.

Exponent evaluation logic 544 may receive exponent 518 and control signals 511 and 512, calculate a mantissa shift amount 521 as described in further detail below, and convey mantissa shift amount 521 to variable mantissa shifter 534. Mantissa shift amount 521 may be used to right-align the radix point of mantissa 531 after the mantissa has been left-aligned in a 64-bit register by variable mantissa shifter 534 in order to perform any of a variety of instructions in addition to instructions that round a floating point number to a nearest integral value. If shift amount 521 is negative, i.e., if the radix point is below the LSB of the left aligned mantissa in the 64-bit register, exponent logic 544 may convey an overflow 523 signal to mask generator 570. If shift amount 521 is greater than or equal to 64, exponent logic 544 may convey an overshift 527 signal to mask generator 570 and to mantissa mux 556. Overshift 527 may be interpreted as an indication that the floating point number is less than "1.0". Consequently, the output of the rounding instruction may be set to "0.0" if the direction indicated by the rounding mode is down and the output of the rounding instruction may be set to "1.0" if the direction indicated by the rounding mode is up. Mantissa mux 556 may receive overshift 527 and mantissa and exponent 541. If overshift 527 is asserted and up/down signal 519 indicates round down, mantissa mux 556 may select and convey a constant of "0.0" to bitwise OR 574. If overshift 527 is asserted and up/down signal 519 indicates round up, mantissa mux 556 may select and convey a constant of "1.0" to bitwise OR 574. If overshift 527 is not asserted, mantissa mux 556 may select and convey mantissa and exponent 541 to bitwise OR 574.

Variable mantissa shifter 534 may receive mantissa 531 and mantissa shift amount 521. Variable mantissa shifter 534 may shift mantissa 531 by the number of bits indicated by mantissa shift amount 521 to produce mantissa 535. Variable mantissa shifter 534 may convey mantissa 535 to GRS 560. GRS 560 may receive shifted mantissa 534 and determine values for guard, round, and sticky bits, where the guard bit is the first bit to the right of the radix point, the round bit is the second bit to the right of the radix point, and the sticky bit is an inclusive OR of any bits to the right of the round bit. GRS 562 may similarly determine values for guard, round, and sticky bits of the mantissa portion of mantissa and exponent 541. GRS 560 and GRS 562 may convey guard, round, and sticky values to round mux 564. Round mux 564 may receive guard, round, and sticky values and control signals 507 and 515, indicating the instruction type and the value of rounding control bits contained in the input instruction, and calculate a value for up/down signal 519 by conventional methods. Round mux 564 may convey up/down signal 519 to mantissa mux 556 and conditional increment 576.

Mask generator 570 may receive mantissa shift amount 521, overflow signal 523, and overshift signal 527 from exponent evaluation logic 544 and an align constant 513 from control logic 260. Mask generator 570 may generate 64-bit mask 526 as described in further detail below and convey the generated mask to bitwise OR 574. In one embodiment, mask 526 includes a value of '0' at each bit position that corresponds to a bit to the left of the radix point in the mantissa of input operand 517 and a value of '1' at each bit position that corresponds to a bit to the right of the radix point in the mantissa of input operand 517.

Bitwise OR 574 may receive mask 526 from mask generator 570 and mantissa and exponent 541 from mantissa mux 56. Bitwise OR may perform a bitwise OR operation between mask 526 and mantissa and exponent 541 and convey a first intermediate result to conditional increment 576. The first intermediate result of a bitwise OR of the mantissa with mask 526 is a new mantissa with all bits to the right of the radix point equal to '1'. Conditional increment 576 may increment the result of the bitwise OR operation if up/down signal 519 indicates round up and convey the incremented second intermediate result to zero fraction 580. If up/down signal 519 indicates round down, conditional increment 576 may convey the result of the bitwise OR operation to zero fraction 580 unchanged as the second intermediate result. The result of the conditional increment is a new mantissa with all bits to the right of the radix point equal to '0'. If up/down signal 519 indicates round up, the conditional increment causes a carry from the MSB of the mantissa to the LSB of the exponent, incrementing the exponent. If input operand 517 is an x87 extended precision operand and if an increment performed by conditional increment 576 results in a carryout from the MSB, conditional increment 576 may convey a mantissa carryout signal 528 to exponent increment 578. Exponent increment 578 may respond to receipt of a mantissa carryout signal 528 by incrementing x87 exponent 553. If input operand 517 is an x87 extended precision operand, exponent increment 578 may convey an x87 exponent to output 590. Zero fraction 580 may receive a mantissa resulting from the operation of conditional increment 576 and set each bit in the mantissa to a value of '0' for which the correspond bit in mask 526 has a value of '1'. Zero fraction 580 may then convey the resulting mantissa and exponent to output 590. The combination of sign 509, the x87 output of exponent increment 578 (if the input operand 517 is an x87 extended precision operand), and the output of zero fraction 580 is a floating point number that is equal to the input operand rounded to the nearest integral value.

In the discussion of FIG. 5 above, rounding logic 501 is used to round a single floating point number included in operand 520. However, in one embodiment, rounding logic 501 may be configurable to perform two independent rounding operations on two floating point numbers included in operand 520 in a packed mode or a single rounding operation on a single floating point number in a non-packed mode. In packed mode, within rounding logic 501, each of mantissa extract 530, exponent extract 532, variable mantissa shifter 534, fixed mantissa mux 540, exponent evaluation logic 544, GRS 560, GRS 562, round mux 564, mantissa mux 556, mask generator 570, and conditional increment 576 may be split into independent halves. Elements in each half receive separate numbers from operand 517, and control signals 507 and 511-515. Separate version of signals exponent 518, mantissa 531, mantissa and exponent 541, mantissa 535 up/down 519, mantissa shift amount 521, overflow 523, overshift 527, and mask 526 may be generated and used to perform separate rounding operations. During operation on a single floating point number, a carry bit may be transferred from a lower half to a higher half of each of variable mantissa shifter 534 and conditional increment 576 to generate a single mantissa 535 and a single, conditionally incremented output, respectively.

Figure 6:
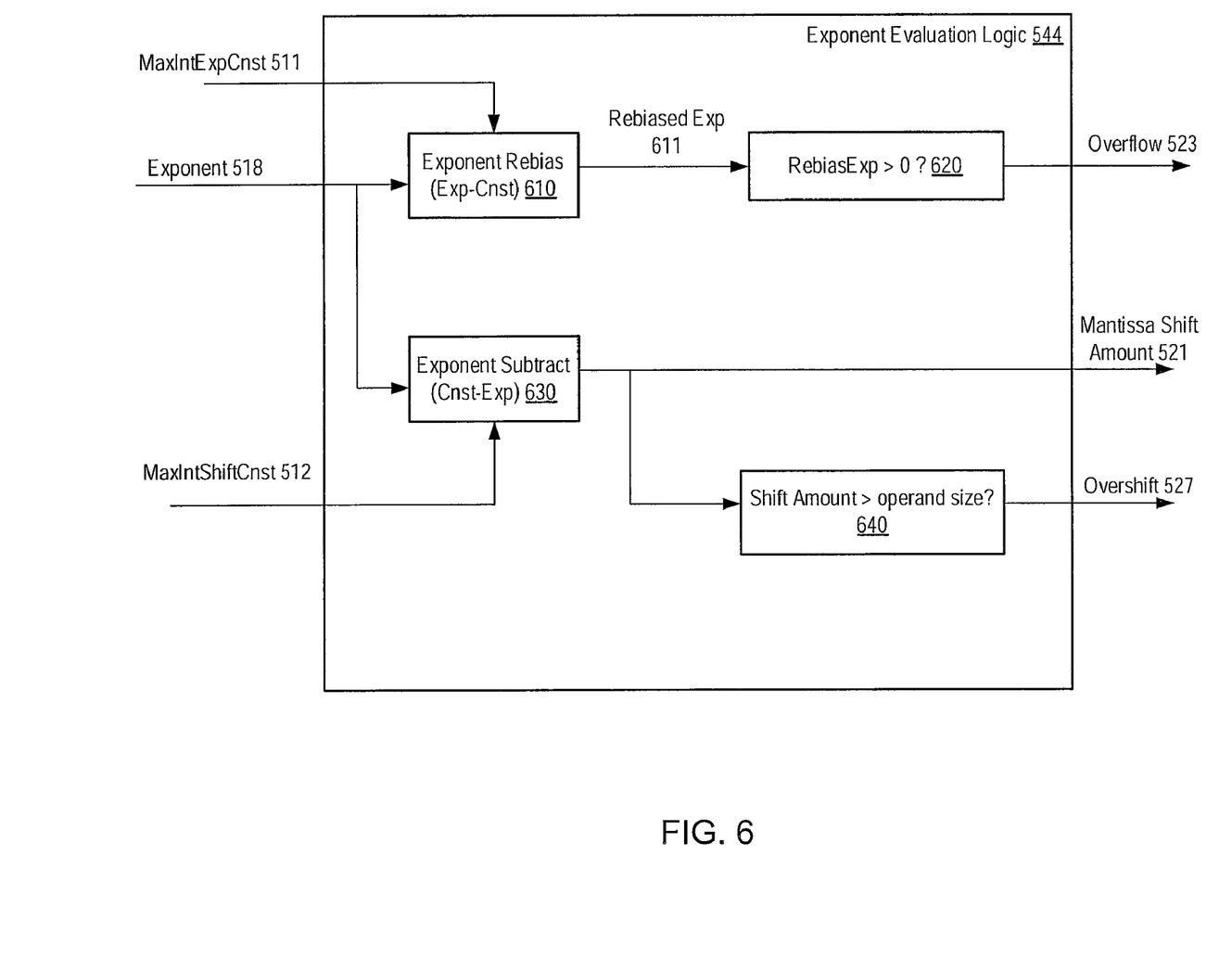
FIG. 6 illustrates one embodiment of exponent evaluation logic.

FIG. 6 illustrates one embodiment of exponent evaluation logic 544. In the illustrated embodiment, exponent evaluation logic 544 includes an exponent rebias component 610 coupled to a comparison component 620 and an exponent subtract component 630 coupled to a comparison component 640. During operation, component 610 may receive exponent 518 and a maximum integer exponent constant MaxIntExpCnst 511. Generally speaking, the value of MaxIntExpCnst 511 may be equal to the sum of the size of the mantissa register plus the exponent bias minus 1. Values of MaxIntExpCnst 511 for various operand levels of precision are listed in Table 5 below. Component 610 may subtract the value of MaxIntExpCnst 511 from the value of exponent 518 to generate a rebiased exponent 611 that is conveyed to comparison component 620. Comparison component 620 determines if rebiased exponent 611 is greater than zero. If so, comparison component 620 may assert overflow 523. Overflow 523 may be conveyed to mask generator 570 as described above. In addition, during operation, component 630 may receive exponent 518 and a maximum integer shift constant MaxIntShiftCnst 512. Generally speaking, the value of MaxIntShiftCnst 512 may be equal to the sum of the size of the mantissa register plus the exponent bias. Values of MaxIntShiftCnst 512 for various operand levels of precision are listed in Table 5 below. Component 630 may subtract the value of exponent 518 from the value of MaxIntShiftCnst 512 to generate a mantissa shift amount 521 that is conveyed to comparison component 640, variable mantissa shifter 534, and mask generator 570. Comparison component 640 determines if mantissa shift amount 521 is greater than the size of the mantissa register. If so, comparison component 640 may assert overshift 527. Overshift 527 may be conveyed to mask generator 570 and to mantissa mux 556 as described above.

In packed mode, each of exponent rebias 610 and exponent subtract 630 may be split into two halves with each half used to perform a separate subtraction. During operation on a single floating point number, a carry bit may be transferred from a lower half to a higher half of exponent rebias 610 and exponent subtract 630. In packed mode, the carry bits may be suppressed.

Figure 7:
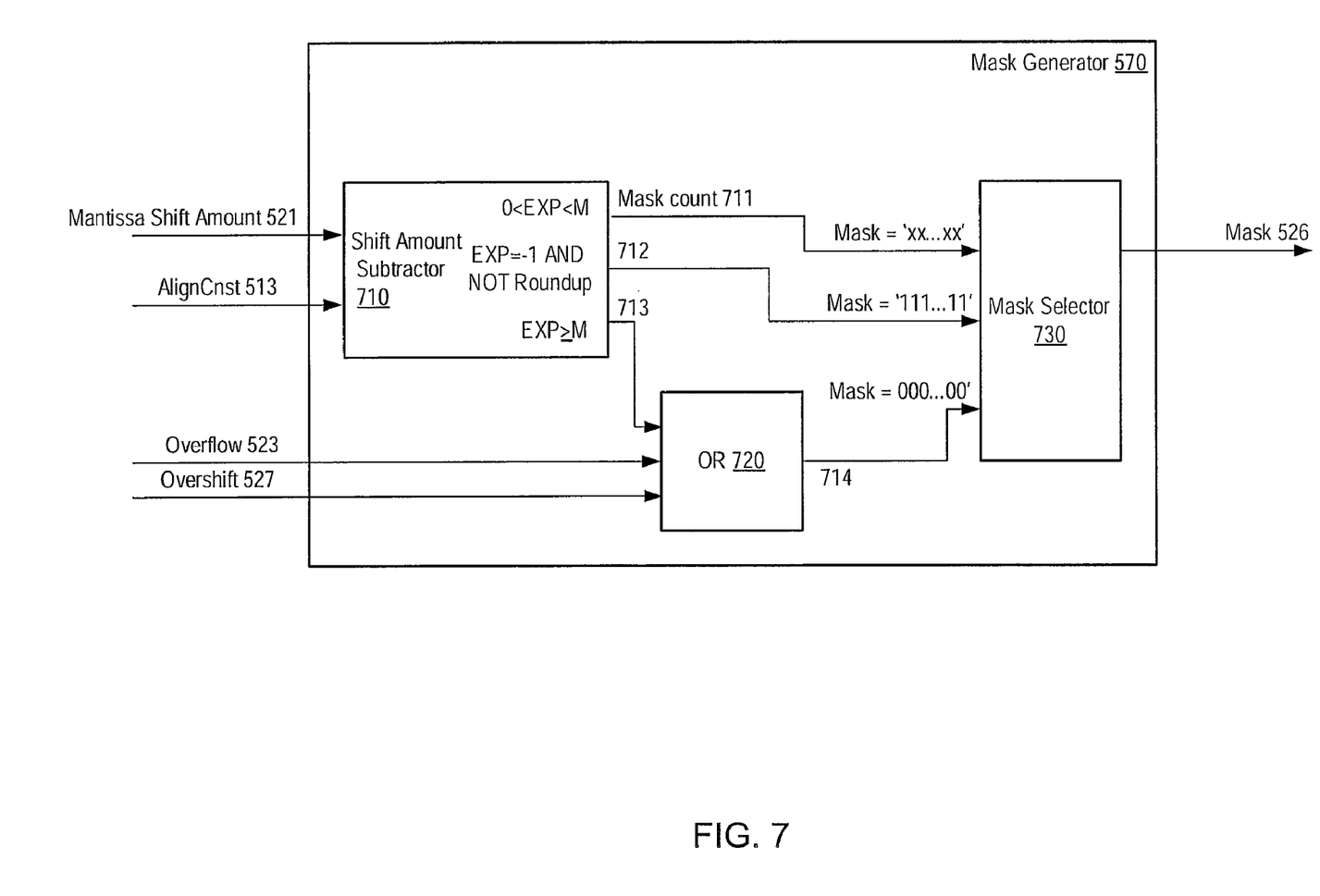
FIG. 7 illustrates one embodiment of a mask generator.

FIG. 7 illustrates one embodiment of mask generator 570. In the illustrated embodiment, mask generator 570 includes a subtractor 710, an OR gate 720, and a mask selector 730. During operation, subtractor 710 may receive mantissa shift amount 521 from exponent evaluation logic 544 and an alignment constant AlignCnst 513 from control logic 260. In one embodiment, the value of AlignCnst 513 may be equal to the size of the mantissa register minus the size of the mantissa. For example, for a 64-bit mantissa register and a double precision number, the value of AlignCnst 513 may be "11". Subtractor 710 may subtract the value of AlignCnst 513 from the mantissa shift amount 521. The result of the subtraction, mask count 711, is equal to the number of bits in the mask that are to be set to a value of '1'. If the result is negative, indicating that all bits of the mantissa are to the left of the radix point, the mantissa subtractor 710 may assert signal 713 and convey signal 713 to OR gate 720. If the result is equal to the number of bits in the mantissa, indicating that all bits of the mantissa are to the right of the radix point, and if the instruction is not a round up instruction, subtractor 710 may assert signal 712 and convey signal 712 to mask selector 730. If the result is zero or if the result is positive and less than the number of bits in the mantissa register (indicating that the number of bits of the mantissa that are to the right of the radix point is equal to the mask count), or if the result is equal to the number of bits in the mantissa and the instruction is a round up instruction, subtractor 710 may assert mask count 711 and convey mask count 711 to mask selector 730. In one embodiment, this range of subtractor results may be referred to as the maskable mantissa range. OR gate 720 receives signal 713, overflow 523, and overshift 527 and asserts signal 714 if any of the input signals is asserted. Mask selector 730 receives mask count 711 and signals 712 and 714. If signal 714 is asserted, mask selector 730 may generate a 64-bit mask with each bit equal to '0', also known as a zero mask. It is noted that the effect of applying a zero mask in bitwise OR 574 is to pass the output of mantissa mux 556 through unchanged. If signal 712 is asserted, mask selector 730 may generate a 64-bit mask with each bit equal to '1'. It is noted that the effect of applying a mask of all '1's in bitwise OR 574 is to produce an output of all '1's. If neither signal 714 or 712 is asserted, mask selector 730 may generate a mask that includes '1's beginning at the LSB and extended to a position that equals the value of mask count 711, followed by '0's extending to the MSB. Mask selector 730 may convey the generated mask to bitwise OR 574 and to zero fraction 580.

In packed mode, each of shift amount subtractor 710, OR 720, and mask selector 730 may be split into two halves with each half used to perform a separate operation. During operation on a single floating point number, a carry bit may be transferred from a lower half to a higher half of shift amount subtractor 710 and the outputs of OR 720 and mask selector 730 concatentated to gegnerate a single mask 526. In packed mode, the carry bit may be suppressed and two separate version of mask 526 may be generated.

Table 5 summarizes the values of constants used in calculations by exponent evaluation logic 544 and mask generator 570 and the resulting exponent ranges.

TABLE 5

Exponent Evaluation Parameters

| Parameter | Single or double operand, single precision | Single operand, double precision | Single operand, extended precision (x87) |
|---|---|---|---|
| R = Mantissa Register Size (bits) | 32 | 64 | 64 |
| M = Mantissa Size (bits), including an implied first bit of '1' | 24 | 53 | 64 |
| Exponent Size (bits) | 8 | 11 | 15 |
| Exponent Bias (B) | 127 | 1023 | 16383 |
| EXP = Exponent | 1 to 254 | 1 to 2046 | 1 to 32766 |
| MaxIntExpCnst = B + (M − 1) | 150 | 1075 | 16446 |
| Rebiased Exponent (e), where e = EXP − MaxIntExpCnst | −149 to 94 | −1074 to 971 | −16445 to 16330 |
| Overflow | e > 0 | e > 0 | e > 0 |
| MaxIntShiftCnst = B + R − 1 | 158 | 1086 | 16446 |
| Exponent Shift (S), where S = MaxIntShiftCnst − EXP | 157 to −96 | 1085 to −960 | 16445 to −16320 |
| Overshift | S > 32 | S > 64 | S > 64 |
| AlignCnst (D), where D = R − 1 − M (bits) | 8 | 11 | 0 |
| Realigned, shifted exponent (S'), where S' = S − D | 151 to −104 | 1074 to −971 | 16445 to −16320 |
| No fraction range | −8 <= S' < 0 | −11 <= S' < 0 | N/A |
| Maskable mantissa range | 0 <= S' < 32 | 0 <= S' < 64 | 0 <= S' < 64 |
| Force output to "0.0" or "1.0" | S' = 32 | S' = 64 | S' = 64 |

Table 6 is an example of the values produced by and within rounding logic 501 for an input of "1.75" for a round up instruction with a single precision source operand.

TABLE 6

Example of round up instruction

| | |
|---|---|
| Input in decimal | "$1.75_{10}$" |
| Input in binary | "$1.11_2$". |
| Biased Source operand | '00111111111000000000000000000000' |
| Mask for round up instruction | '00000000011111111111111111111111' |

TABLE 6-continued

Example of round up instruction

| | |
|---|---|
| First intermediate result | '00111111111111111111111111111111' |
| Second intermediate result (incremented) | '01000000000000000000000000000000' |
| Inverted mask | '11111111100000000000000000000000' |
| Biased Output | '01000000000000000000000000000000' |
| Output in binary | "$10.0_2$" |
| Output in decimal | "$2.0_{10}$" |

Table 7. is an example of the values produced by and within rounding logic 501 for an input of "1.75" for a round down instruction with a single precision source operand.

TABLE 7

Example of round down instruction

| | |
|---|---|
| Input in decimal | "$1.75_{10}$" |
| Input in binary | "$1.11_2$" |
| Biased Source operand | '00111111111000000000000000000000' |
| Mask for round down instruction | '00000000011111111111111111111111' |
| First intermediate result | '00111111111111111111111111111111' |
| Second intermediate result (not incremented) | '00111111111111111111111111111111' |

TABLE 7-continued

Example of round down instruction

| | |
|---|---|
| Inverted mask | '11111111100000000000000000000000' |
| Output (note mantissa does not show implied '1' MSB). | '00111111100000000000000000000000' |
| Output in binary | "$1.0_2$" |
| Output in decimal | "$1.0_{10}$" |

Figure 8:
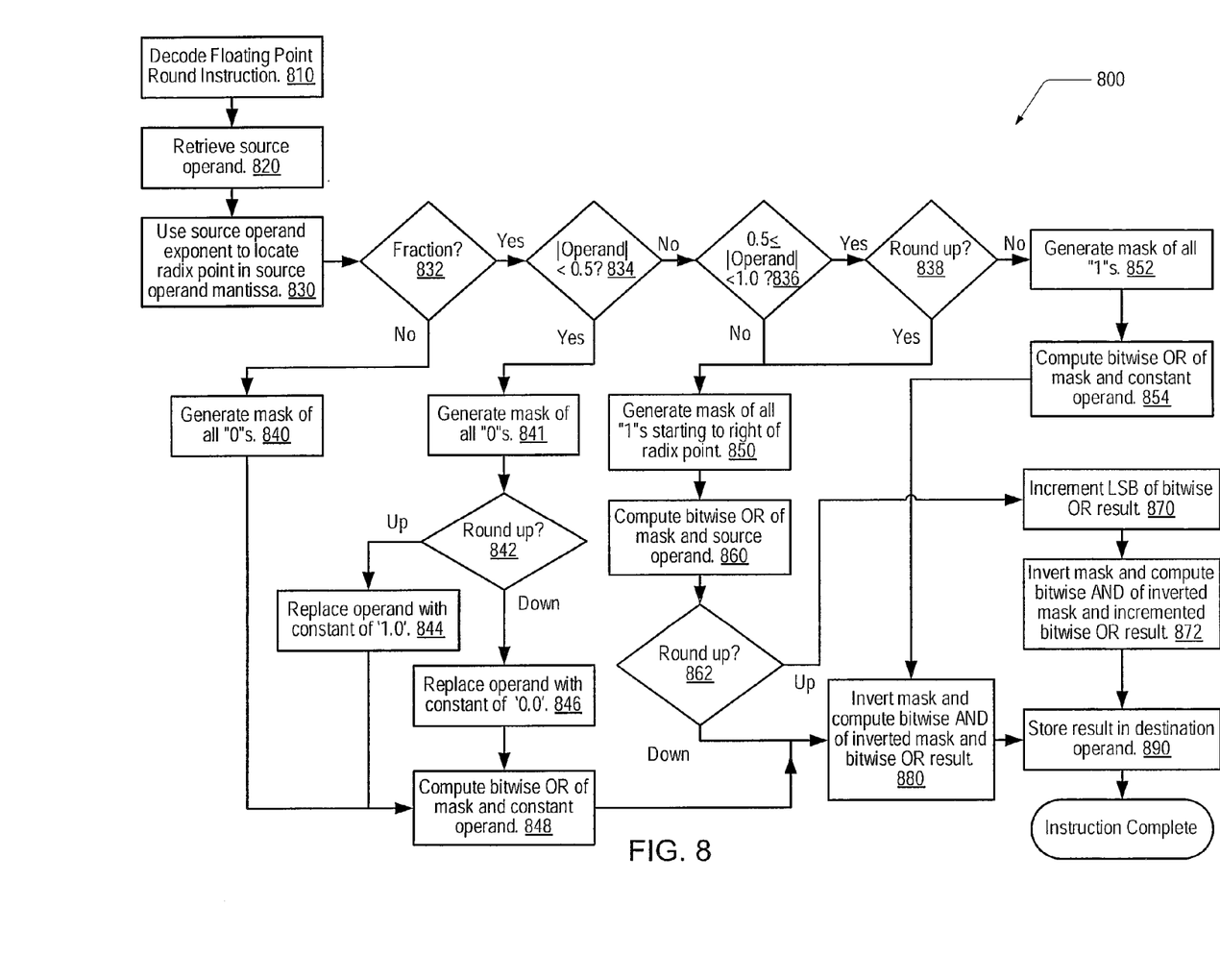
FIG. 8 illustrates one embodiment of a process that may be used to perform floating point rounding instructions.

FIG. 8 illustrates one embodiment of a process 800 that may be used to perform floating point rounding instructions. Process 800 begins with decoding of a floating point rounding instruction (block 810). From the decoded instruction, a source operand location may be determined and a source operand retrieved (block 820). The exponent of the source operand may be evaluated to locate the radix point in the mantissa of the floating point number that the source operand represents (block 830). If the location of the radix point is to the right of the LSB of the mantissa (decision block 832), i.e., if the floating point number that the source operand represents has no fractional component, then a mask of all '0's may be generated (block 840). A bitwise OR of the operand with the mask of all '0's may be computed (block 848). The mask may then be inverted and a bitwise AND of the inverted mask and the bitwise OR result may be computed (block 880). The result of the bitwise AND may be stored in the destination operand (block 890), completing execution of the floating point rounding instruction.

If the location of the radix point is to the left of the LSB of the mantissa (decision block 832), i.e., if the floating point number that the source operand represents has a fractional component, and if the absolute value of the operand is less than 0.5 (decision block 834) i.e., if the integral component of the floating point number that the source operand represents is zero, then a mask of all '0's may be generated (block 841). If the combination of the rounding mode and the values of the guard, round and sticky bits indicate that the instruction requires a round up (decision block 842), the operand may be replaced with a constant equal to "1.0" (block 844). If the combination of the rounding mode and the values of the guard, round, and sticky bits indicate that the instruction requires a round down (decision block 842), the operand may be replaced with a constant equal to "0.0" (block 846). A bitwise OR of either constant ("0.0" or "1.0") with the mask of all '0's may be computed (block 848) and flow may continue at block 880 as described above, to complete execution of the floating point rounding instruction.

If the location of the radix point is to the left of the LSB of the mantissa (decision block 832), and if the absolute value of the operand is neither less than "0.5" (decision block 834) nor greater than or equal to "0.5" and less than then "1.0" (decision block 836), or if the absolute value of the operand is greater than or equal to "0.5" and less than then "1.0" (decision block 836) and the instruction corresponds to a round up instruction (decision block 838), a mask may be generated consisting of '1's to the right of the radix point and '0's to the left of the radix point (block 850). A bitwise OR of the source operand with the mask may be computed (block 860). If the combination of the rounding mode and the values of the guard, round and sticky bits indicate that the instruction requires a round up (decision block 862), the least significant bit (LSB) of the result of the bitwise OR may be incremented (block 870). The mask may then be inverted and a bitwise AND of the inverted mask and the incremented bitwise OR result may be computed (block 872). The result of the bitwise AND may be stored in the destination operand (block 890), completing execution of the floating point rounding instruction. If the combination of the rounding mode and the values of the guard, round, and sticky bits indicate that the instruction requires a round down (decision block 862), the mask may then be inverted and a bitwise AND of the inverted mask and the bitwise OR result may be computed (block 880). The result of the bitwise AND may be stored in the destination operand (block 890), completing execution of the floating point rounding instruction.

If the absolute value of the operand is greater than or equal to "0.5" and less than then "1.0" (decision block 836) and the instruction does not corresponds to a round up instruction (decision block 838), a mask may be generated consisting of all '1's (block 852). A bitwise OR of the operand with the mask of all '1's may be computed (block 854). Flow may then continue at block 880, as described above, to complete execution of the floating point rounding instruction.

Figure 9:
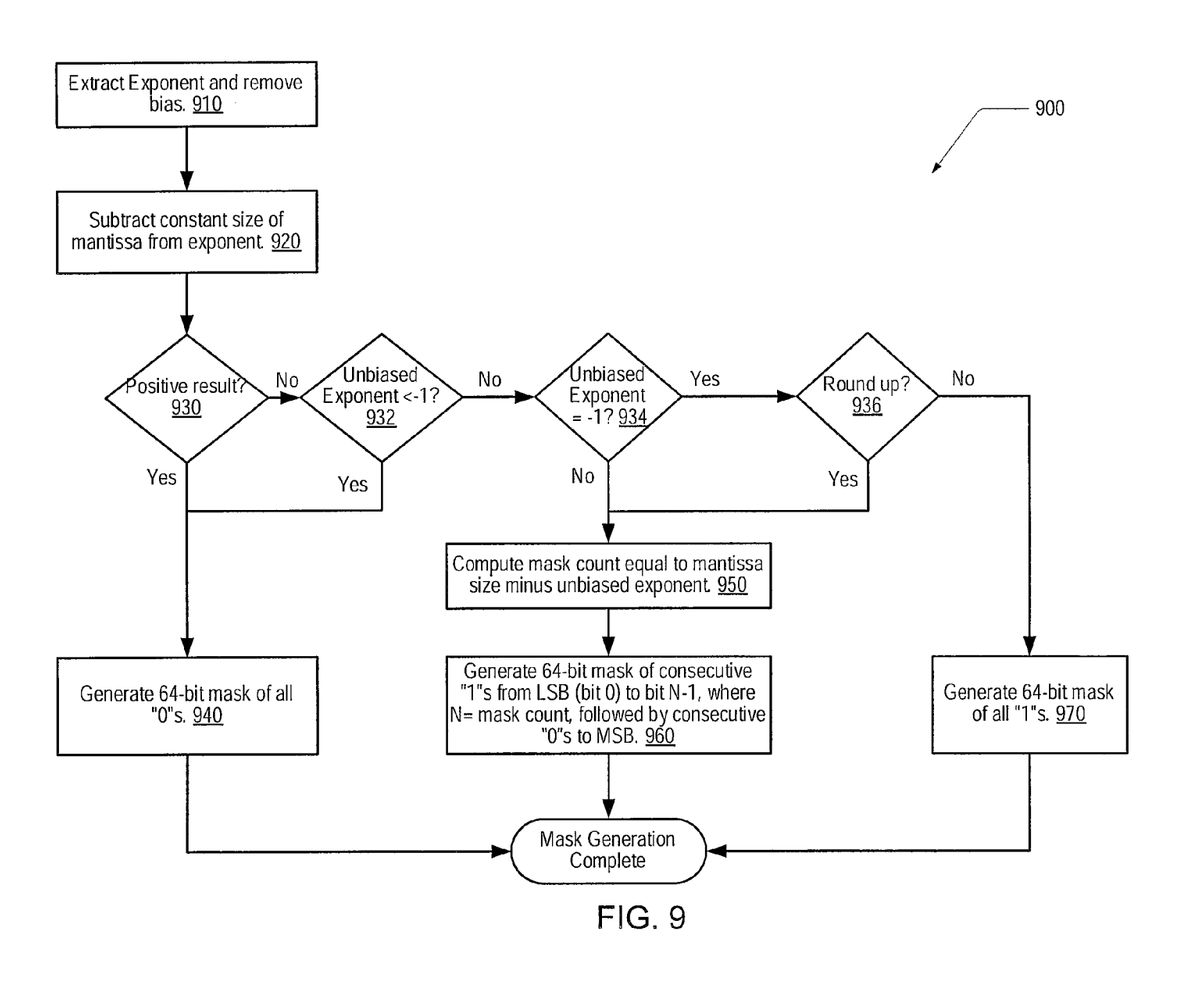
FIG. 9 illustrates one embodiment of a process that may be used to generate a mask for rounding floating point number to a nearest integral value.

FIG. 9 illustrates one embodiment of a process 900 that may be used to generate a mask for rounding a floating point number to a nearest integral value. Generally speaking, process 900 may be considered an alternative, more detailed embodiment of blocks 830, 832, 834, 836, 838, 840, 850, and 852 of process 800. Process 900 may begin with extraction of an exponent and removal of the exponent bias from a floating point number (block 910). Once the bias has been removed from the exponent, a constant may be subtracted from the unbiased exponent, where the value of the constant is equal to the number of bits in the mantissa (block 920). If the result of the subtraction is positive (decision block 930), indicating the floating point number that the source operand represents has no fractional component, or if the unbiased exponent is less than "−1" (decision block 932), a mask of all '0's may be generated (block 940), completing the mask generation process.

If the result of the subtraction is not positive (decision block 930) and the unbiased exponent is not less than "−1" (decision block 932) and if the unbiased exponent is not equal to "−1" (decision block 934), or if the result of the subtraction is not positive (decision block 930) and the unbiased exponent is not less than "−1" (decision block 932) and if the unbiased exponent is equal to "−1" (decision block 934) and the instruction corresponds to a round up instruction (decision block 936), a mask count may be computed, where the value of the mask count is equal to the number of bits in the mantissa minus the value of the unbiased exponent (block 950). Once a mask count has been computed, assuming the value of the mask count is "N", a 64-bit mask may be generated in which the first N bits starting with the LSB are '1's and the remaining bits are '0's (block 960), completing the mask generation process.

If the result of the subtraction is not positive (decision block 930) and the unbiased exponent is not less than "−1" (decision block 932) and if the unbiased exponent is equal to "−1" (decision block 934) and the instruction does not correspond to a round up instruction (decision block 936), a mask of all '1's may be generated (block 970), completing the mask generation process.

It is noted that the foregoing flow chart is for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

It is further noted that the above-described embodiments may comprise software. For example, the functionality of rounding logic 501 may be implemented in hardware, software, firmware, or some combination of the above. In such embodiments, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a decode unit; and
a floating point unit configured to receive from the decode unit an instruction;
wherein in response to determining the instruction corresponds to a floating point round to nearest integer instruction for a floating point number, the
floating point unit is configured to:
retrieve a binary source operand corresponding to the instruction;
compute an unbiased exponent value;
generate a binary mask based at least in part on said unbiased exponent value, wherein said mask indicates a least significant digit of a nearest integer value to the floating point number;
compute a first intermediate result equal to a bitwise OR of the source operand with the binary mask;
compute a second intermediate result based at least in part on said first intermediate result;
compute a bitwise inverse of the binary mask; and
generate a rounded floating point number by performing a bitwise AND of the inverse of the binary mask and the second intermediate result, wherein the rounded floating point number is a floating point number with an integer value.

2. The processor of claim 1, wherein
if the instruction corresponds to a round down instruction, the second intermediate result is equal to the first intermediate result; and
if the instruction corresponds to a round up instruction, the second intermediate results is equal to the first intermediate result incremented by one.

3. The processor of claim 1, wherein the source operand has an exponent represented by a first number of bits and a mantissa represented by a second number of bits, and wherein to generate said binary mask, the floating point unit is configured to:
if the unbiased exponent value is greater than or equal to zero and less than a given number:
calculate a mask count whose value is equal to the given number minus the unbiased exponent value; and
generate the binary mask to have N consecutive bits with a value of '1' beginning with the least significant bit and whose remaining bits have a value of '0', where N is a number whose value is equal to the value of the mask count;
if the unbiased exponent value is greater than or equal to the given number, generate the binary mask to have all bits with a value of "0".

4. The processor of claim 3, wherein if the unbiased exponent value is less than "−1", the floating point unit is further configured to:
generate the binary mask with each bit having a value of '0'; and
prior to computing the first intermediate result:
replace the source operand with a constant whose value is "0.0", if the instruction corresponds to a round down instruction; and
replace the source operand with a constant whose value is "1.0", if the instruction corresponds to a round up instruction.

5. The processor of claim 3, wherein the first number of bits is 15 and the second number of bits is 64.

6. The processor of claim 1, wherein if the unbiased exponent value is equal to "−1" the floating point unit is further configured to generate the binary mask in which each bit has a value of '1'.

7. The processor of claim 1, wherein the source operand comprises a plurality of packed floating point values and the instruction corresponds to an instruction to round each of the plurality of floating point values to a respective nearest integral value.

8. A floating point unit comprising:
a data extraction unit; and
rounding logic;
wherein the data extraction unit is configured to:
receive a floating point round to nearest integer instruction for a floating point number; and
retrieve a binary source operand corresponding to the instruction;
wherein the rounding logic is configured to:
compute an unbiased exponent value;
generate a binary mask based at least in part on said unbiased exponent value, wherein said mask indicates a least significant digit of a nearest integer value to the floating point number;
compute a first intermediate result equal to a bitwise OR of the source operand with the binary mask;
compute a second intermediate result based at least in part on said first intermediate result;
compute a bitwise inverse of the binary mask; and
generate a rounded floating point number by performing a bitwise AND of the inverse of the binary mask and the second intermediate result, wherein the rounded floating point number is a floating point number with an integer value.

9. The floating point unit of claim 8, wherein
if the instruction corresponds to a round down instruction, the second intermediate result is equal to the first intermediate result; and
if the instruction corresponds to a round up instruction, the second intermediate results is equal to the first intermediate result incremented by one.

10. The floating point unit of claim 8, wherein the source operand has an exponent represented by a first number of bits and a mantissa represented by a second number of bits, and wherein to generate said binary mask, the rounding logic is configured to:
if the unbiased exponent value is greater than or equal to zero and less than a given number:
calculate a mask count whose value is equal to the given number minus the unbiased exponent value; and
generate the binary mask to have N consecutive bits with a value of '1' beginning with the least significant bit and whose remaining bits have a value of '0', where N is a number whose value is equal to the value of the mask count;
if the unbiased exponent value is greater than or equal to the given number, generate the binary mask to have all bits with a value of "0".

11. The floating point unit of claim 10, wherein the first number of bits is 15 and the second number of bits is 64.

12. The floating point unit of claim 8, wherein if the unbiased exponent value is equal to "−1" the rounding logic is further configured to generate the binary mask in which each bit has a value of '1'.

13. The floating point unit of claim 8, wherein the source operand comprises a plurality of packed floating point values and the instruction corresponds to an instruction to round each of the plurality of floating point values to a respective nearest integral value.

14. A method of computing a rounded floating point value in a processor, the method comprising:
  decoding an instruction in a decode unit;
  receiving the decoded instruction from the decode unit;
  in response to determining the instruction corresponds to a floating point round to nearest integer instruction for a floating point number:
    retrieving a binary source operand corresponding to the instruction;
    computing an unbiased exponent value;
    generating a binary mask based at least in part on said unbiased exponent value, wherein said mask indicates a least significant digit of a nearest integer value to the floating point number;
    computing a first intermediate result equal to a bitwise OR of the source operand with the binary mask;
    computing a second intermediate result based at least in part on said first intermediate result;
    computing a bitwise inverse of the binary mask; and
    generating a rounded floating point number by performing a bitwise AND of the inverse of the binary mask and the second intermediate result, wherein the rounded floating point number is a floating point number with an integer value.

15. The method of claim 14, wherein
  if the instruction corresponds to a round down instruction, the second intermediate result is equal to the first intermediate result; and
  if the instruction corresponds to a round up instruction, the second intermediate results is equal to the first intermediate result incremented by one.

16. The method of claim 14, wherein the source operand has an exponent represented by a first number of bits and a mantissa represented by a second number of bits, and wherein generating said binary mask comprises:

if the unbiased exponent value is greater than or equal to zero and less than a given number:
    calculating a mask count whose value is equal to the given number minus the unbiased exponent value; and
    generating the binary mask to have N consecutive bits with a value of '1' beginning with the least significant bit and whose remaining bits have a value of '0', where N is a number whose value is equal to the value of the mask count;
  if the unbiased exponent value is greater than or equal to the given number, generating the binary mask to have all bits with a value of "0".

17. The method of claim 16, wherein if the unbiased exponent value is less than "−1", the method comprises:
  generating the binary mask with each bit having a value of '0'; and
  prior to computing the first intermediate result:
    replacing the source operand with a constant whose value is "0.0", if the instruction corresponds to a round down instruction; and
    replacing the source operand with a constant whose value is "1.0", if the instruction corresponds to a round up instruction.

18. The method of claim 16, wherein the first number of bits is 15 and the second number of bits is 64.

19. The method of claim 14, wherein if the unbiased exponent value is equal to "−1" the method further comprises generating the binary mask in which each bit has a value of '1'.

20. The method of claim 14, wherein the source operand comprises a plurality of packed floating point values and the instruction corresponds to an instruction to round each of the plurality of floating point values to a respective nearest integral value.

* * * * *